Oct. 27, 1964  W. W. MULTANEN  3,153,876
MULTI-FORM FISH LURE
Filed Oct. 15, 1962  2 Sheets-Sheet 1
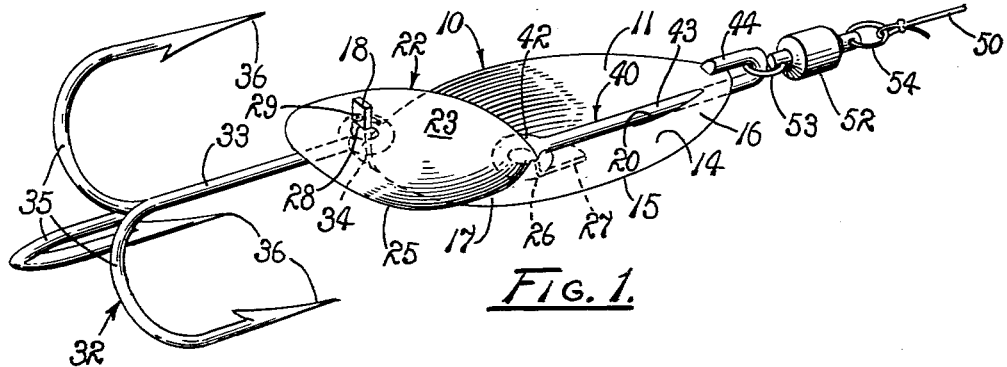
FIG. 1.
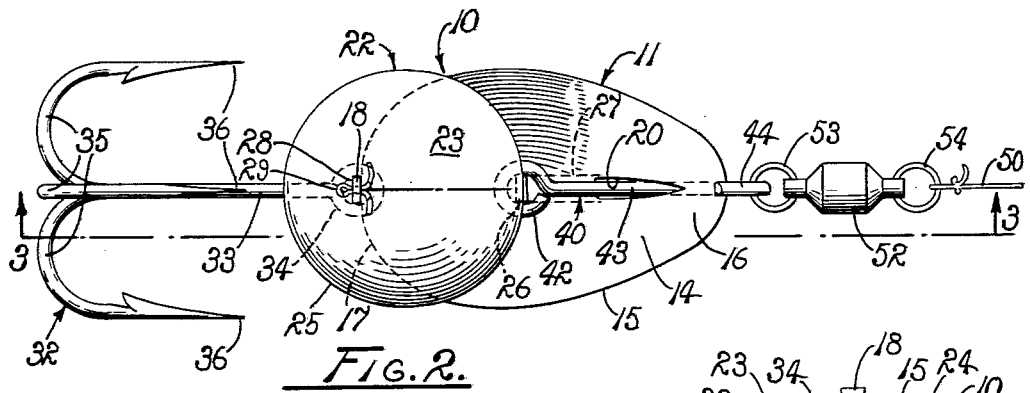
FIG. 2.
FIG. 4.
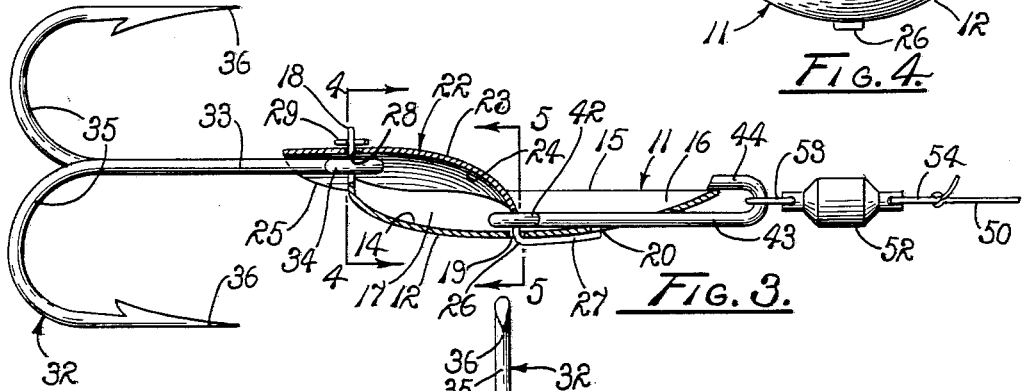
FIG. 3.
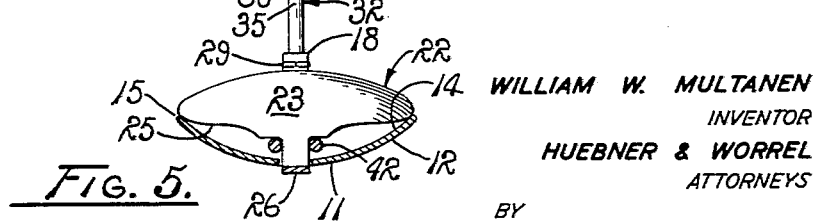
FIG. 5.
WILLIAM W. MULTANEN
INVENTOR
HUEBNER & WORREL
ATTORNEYS
BY
Richard M. Worrel

United States Patent Office 3,153,876
Patented Oct. 27, 1964

3,153,876
MULTI-FORM FISH LURE
William W. Multanen, Santa Cruz, Calif.
(3650 N. Maple, Fresno, Calif.)
Filed Oct. 15, 1962, Ser. No. 230,554
7 Claims. (Cl. 43—42.09)

The present invention relates to a multi-form fish lure having a plurality of releasably connected components which can be arranged and held in varied operating assemblies to provide different lure appearances and operational fish attracting actions.

Conventional fish lures are provided in a wide variety of configurations, many of which have particular individual actions intended to be attractive to certain species of fish. Thus, to provide adequate variety, a large number of lures are required. This leads to excessive expense. Further, in order to transport such large numbers of lures, large tackle boxes are required. Because of their bulk and weight, such boxes are not convenient to carry and often are left on shore when stream or surf fishing is involved and when there is not sufficient boat space available. Such practice is objectionable when the fisherman decides to change lures. He must necessarily return to shore and search through the large number of lures and other equipment in the tackle box to find the desired lure.

Additionally, conventional lures are provided with either single, double, or treble hooks permanently fastened thereto. They are not readily adapted to environmental requirements or legal restrictions. The lure of the present invention is intended to overcome these and other problems encountered with conventional fish lures.

Therefore, it is an object of the present invention to provide a fish lure having improved fish attracting characteristics and is readily adapted for universal use.

Another object is to provide a fish lure of the character described which is quickly and easily converted to provide a plurality of lure appearances and fish attracting actions.

Another object is to provide a fish lure which is readily adapted for use with single, double or treble hooks.

Another object is to provide a fish lure which is capable of effective operation in a variety of fish attracting attitudes.

Another object is to provide a fish lure which is readily converted to an assembly providing audible fish attracting sounds during operation.

Another object is to provide a fish lure which is quickly assembled and disassembled to provide a plurality of distinctive lure appearances and/or actions.

Other objects and advantages of the present invention will become more fully apparent in the following description in the specification.

In the drawings:

FIG. 1 is a perspective view of the fish lure of the present invention showing its several components in one assembled position.

FIG. 2 is a top plan view of the fish lure of FIG. 1.

FIG. 3 is a longitudinal vertical section through the fish lure taken on line 3—3 of FIG. 2.

FIG. 4 is a transverse vertical section through the body of the lure taken on line 4—4 of FIG. 3.

FIG. 5 is a transverse vertical section through the body of the lure taken on line 5—5 of FIG. 3.

Figure 6:
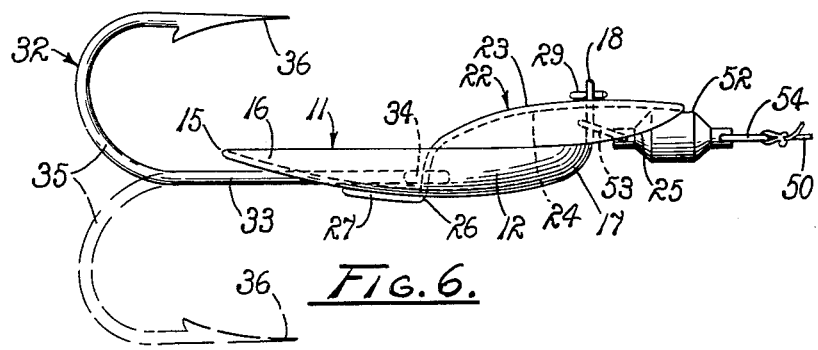
FIG. 6 is a side elevation of the lure of the present invention showing its several components converted to an alternate assembled form from that of the preceding figures.

Referring more particularly to the drawings, the fish lure embodying the principles of the present invention is shown having an elongated body 10 symmetrically arranged on a longitudinal axis. The body includes a first segment or spoon 11 preferably of metallic material which is substantially egg-shaped when viewed in plan as in FIG. 2 and is concavo-convex when viewed in side elevation or in section as in FIGS. 3, 4 and 5. The spoon is preferably metallic or metallic coated for light reflecting purposes and provides an outer convex surface 12 and an opposite concave inner surface 14 which terminate in a substantially continuous planar edge 15. The spoon also includes opposite relatively small and large ends 16 and 17, respectively, the latter of which has an integral relatively narrow shank 18 extended therefrom in a plane substantially normal to the plane of the edge 15 in alignment with the longitudinal axis of the body. An aperture 19 is provided in the spoon centrally of the edge 15 and also aligned with the longitudinal axis of the body. An elongated slot 20 is formed through the spoon intermediate the aperture 19 and the small end 16 thereof in alignment with the longitudinal axis of the body.

The body 10 also includes a second segment or spoon 22 which is substantially circular when viewed in plan as in FIG. 2. and is concavo-convex when viewed in side elevation or in section as viewed in FIGS. 3, 4, and 5. The spoon 22 has a convex outer surface 23 and an opposite concave inner surface 24 which meet at an outer edge 25. An integral shank 26 is outwardly extended from the edge in continuous curving relation from the outer and inner surfaces of the second spoon and provides an angularly bent outer end 27 longitudinally extended in conforming relation to the outer surface of the first spoon 11 of the body. An aperture 28 is formed through the second spoon 22 adjacent to the edge 25 in substantially diametrically opposed relation to the shank 26.

In each converted position of the lure body, the first and second spoons 11 and 22 are adapted to be assembled in the same manner, as best shown in FIG. 3. In such position, the spoons of the body are adapted to be positioned in overlapping longitudinally staggered edgeward engagement. Such position is obtained by extending the outer end 27 of the shank 26 of the second spoon 22 through the aperture 19 of the first spoon 11. The shank 18 of the first spoon 11 is received through the aperture 28 in the second spoon 22 and a locking pin or cotter key 29 is extended through a suitable aperture in the shank 18 to engage the outer surface 23 of the second spoon to retain the same in assembled position.

In FIGS. 1 through 5, a treble fishhook 32 is shown associated with the body 10. The fishhook provides an elongated shank portion 33 having a predetermined forward eye portion 34 and a plurality of return-bent ends 35 which terminate in barbed ends 36. While the fishhook is shown as having a plurality of barbed ends, such hook could be of the double or single hook variety without enlarging the scope of the present invention. In this form of the lure body, the eye portion 34 of the hook is adapted to receive the shank 18 of the first spoon portion of the body prior to assembly with the second spoon portion thereof. Also in this form, an elongated connector rod 40 is adapted to be mounted on the body in opposed relation to the fishhook 32. The connector rod provides an eye portion 42 which is adapted readily to slide over the shank 26 of the second spoon 22 of the body, an intermediate substantially straight shank portion 43 which is adapted to be extended through the elongated slot 20 in the first spoon 11 of the body and a return-bent end 44 which is adapted to engage and be closed by the edge 15 of the first spoon.

An elongated leader line 50 is adapted in this form to be connected to the return-bent end 44 of the connecting rod 40 by way of a swivel connector 52. The swivel carries a pair of opposite ring members 53 and 54 which are adapted to engage the return-bent end 44 of the rod and the leader line 50 respectively. In this form of the invention, the small end 16 of the first spoon 11 of the body 10 is adapted to be the forward or leading end of the lure with the hook trailing the body from the second spoon 22 thereof.

The lure 10 of the present invention is easily converted to the appearance of FIG. 6 of the drawing wherein the connecting rod 40 is omitted from the assembly. In such assembly, the ring member 53 of the swivel connector 52 is adapted to receive the shank 18 of the first spoon 11 prior to assembly with the second spoon 22. The eye portion 34 of the fishhook 32 is received by the shank 26 of the second spoon 22 with the shank 33 thereof extended through the elongated slot 20. In this form, the fishhook 32 is shown having a single barbed end 36 which may be assembled in either the full line or inverted broken line position. In assembly, the overlapping outwardly extended end of the second spoon 22 of the body becomes the leading end of the lure with the small end 16 of the first spoon 11 trailing and carrying the barbed end of the hook.

Figure 7:
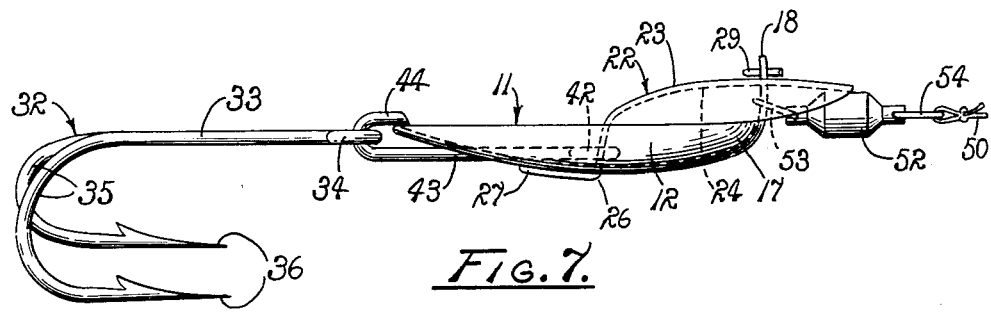
FIG. 7 is a side elevation of the fish lure showing its several components converted to another alternate assembled form.

The converted form of the lure of the present invention as shown in FIG. 7 retains the leader line 50 and swivel connector 52 adjacent to the second spoon 22 of the body 10. The fishhook 32, however, is replaced by the connector rod 40 as in FIGS. 1 through 5 which in this instance instead of providing a connection for the leader line 50 mounts the fishhook 32 in trailing relation to the body. In this form, the fishhook has a pair of barbed ends 36 which again may be disposed in either of two positions.

Operation

The operation of the described embodiments of the subject invention is believed to be clearly apparent and is briefly summarized at this point. With the several components of the lure body 10 arranged as in FIGS. 1 through 5, the lure is adapted to be drawn through the water on the outer convex surface 12 of the first spoon 11 by the leader line 50. The swivel connector 52 is adapted to preclude entanglement of the line and twisting or other displacement of the body from such operating position. The action of the lure is further enhanced by the trailing fishhook 32 which, in combination with the bright surface of the body, presents a fish-attracting disturbance as the lure is drawn through the water. The concavo-convex spoons impart a porpoising action to the lure which has been found to be desirable.

When it is desired to alter the appearance or to change the action of the lure, it is quickly and easily disassembled from the form shown in FIGS. 1 and 5. The cotter key is removed from the shank 18 which permits the second spoon 22 to be pivoted about its shank 26 for freeing the eye 34 of the hook from the shank 18 of the first spoon. The second spoon is then further pivoted to align the outer end 27 of the shank with the aperture 19 in the first spoon so that the spoons may be entirely separated from each other. Such separation liberates the connector rod 40 so that it may slide outwardly through the elongated slot 20 in the first spoon and the ring member 53 and the swivel connector 52 removed therefrom.

In order to reassemble the lure in the arrangement of FIG. 6, the eye 34 and shank 33 of the fishhook are extended through the elongated slot 20 in the first spoon to a position with the eye registered with the aperture 19 in the first spoon. The ring 53 of the swivel connector 52 is slipped over the shank 18. The shank 26 of the second spoon is then extended through the eye 34 of the fishhook and the aperture 19 and the second spoon pivoted thereabout to receive the shank 18 through the aperture 28 therein. The cotter key 29 is extended through the aperture in the shank 18 to hold the first and second spoons of the body in edgeward engagement with a portion of the second spoon overhanging the first spoon in partial covering relation to the swivel connector 52. Inasmuch as the large end 17 of the first spoon is now adjacent to the leading end of the lure, an entirely different fish-attracting action is created by the body 10 as the lure is drawn through the water. Also by omitting the connector rod 40, the barbed end of the fishhook is positioned closer to the lure which changes the water disturbing characteristics from the lure assembly of FIGS. 1 through 5. Furthermore, in the arrangement of FIG. 6, the swivel connector 52 functions as a clapper against the inner surface 24 of the second spoon to produce an audible fish-attracting sound as the leader line causes the lure to porpoise in the water.

The sound producing feature of the lure arrangement of FIG. 6 is retained in the arrangement of FIG. 7 wherein the large end 17 of the first spoon remains adjacent to the leading end of the lure. In this arrangement, however, the fishhook 32 is removed from direct connection with the body by removing the cotter key 29 and disassembling the first and second spoons 11 and 22, respectively, in the above described manner. In this arrangement, the ring member 53 of the swivel connector 52 remains as in FIG. 6 engaged about the shank 18 of the first spoon. The connecting rod 40 is then reassembled to its former position of FIGS. 1 through 5 replacing the fishhook 32. The eye portion 42 of the rod is disposed about the shank 26 and the shank extended through the slot 20 of the first spoon and its return-bent end rearwardly extended therefrom to receive the eye 34 of the fishhook. In this arrangement, a somewhat different fish-attracting action is provided by the trailing fishhook 32.

Although not shown, it is readily apparent that the fishhook 32 can be positioned an even greater distance behind the lure body by providing any desired length of leader line between the hook and the return-bent end 44 of the connecting rod 40. Such arrangement is also possible in the arrangement of FIGS. 1 through 5 with the lure body inverted from the positions of FIGS. 6 and 7.

From the foregoing, it is readily apparent that the fish lure of the present invention has provided an improved multi-form lure which is easily converted to a plurality of operating assemblies with each of the assemblies providing a distinctively different lure appearance and action. The lure is also adapted to accommodate any style of fishhook which may be quickly and easily mounted thereon in different positions during conversion of the lure to said plurality of assemblies.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A multi-form fish lure comprising a body having a pair of separable segments providing integral projections thereon and spaced apertures therethrough to receive the projection of opposite segments of the body to connect said segments in predetermined assembled relation, locking means mounted on one of said projections retractably to hold the segments in said assembled relation, a fishhook mountable on one of said projections, a connecting rod mountable on the other of said projections, and a leader line mountable on one of said projections, said fishhook, said connecting rod, and said leader line being interchanegable on said projections to change the lure appearance and operational action thereof.

2. A fish lure comprising a body having a pair of sections each providing a centrally disposed aperture therethrough, and a shank portion extended from each section through the aperture of the opposite section of the body; retractable locking means engageable with one of said shanks to hold the sections in contiguous relation, a fishhook adapted to be interchangeably selectively mounted on one of said shanks in outwardly extended relation from the body, and line connecting means adapted to be interchangeably mounted on the other of the shanks in opposed relation from the fishhook to provide a plurality of lure appearances and actions.

3. A fish lure comprising an elongated body having a pair of concavo-convex spoon portions disposed in overlapping longitudinally staggered relation with each providing centrally disposed apertures therethrough, one of said spoon portions having an elongated substantially straight shank extended therefrom, the other of said spoon portions having an angularly bent shank extended therefrom, said shanks being extended through said apertures of the opposite spoon portions of the body, locking means retractably extended through said straight shank to hold the spoon portions of the body in assembly, a fishhook adapted to be selectively mounted in a variety of positions on the body by connection to either of said shanks, and a leader line interchangeably mounted on the other of said shanks in opposed relation to said fishhook providing a plurality of lure appearances and actions.

4. A multi-form fish lure comprising an elongated body having first and second concavo-convex spoon portions adapted to be assembled in overlapping longitudinally staggered relation, each spoon portion providing a centrally disposed aperture therethrough, said first spoon portion having an elongated substantially straight shank adapted to be extended through the aperture of the second spoon portion, the second spool portion having an angularly bent shank adapted to extend through the aperture of the first spoon portion, locking means connected to said straight shank for holding the spoon portions in such assembly, a fishhook having an eye portion, a leader line including an eye portion adapted to receive either of said shanks prior to assembly of the spoon portions, and a connecting rod having an eye portion adapted to receive the other shank prior to assembly of the spoon portions and a return-bent end closed by the first spoon portion to engage alternately the eye of the fishhook and the eye portion of the leader line for pivotally mounting the fishhook and the line on the body, said fishhook, said connecting rod and said leader line being selectively interchangeably mounted alternately on said shanks, and said fishhook and said leader line being selectively interchangeably mounted alternately on said shanks and the return-bent end of said rod when said rod is mounted on one of said shanks to change the appearance and operational action of the fish lure.

5. A multi-form fish lure comprising an elongated body having first and second concavo-convex spoon portions adapted to be assembled in overlapping longitudinally staggered relation, each spoon portion providing a centrally disposed aperture therethrough, said first spoon portion having an elongated substantially straight shank adapted to be extended through the aperture of the second spoon portion and including an elongated slot therethrough in spaced relation to said centrally disposed aperture, the second spoon portion having an angularly bent shank adapted to extend through the centrally disposed aperture of the first spoon portion, locking means connected to said straight shank for holding the spoon portions in such assembly, a connecting rod having an eye portion receiving said angularly bent shank of the second spoon portion and including a shank portion extended through said elongated slot in the first spoon portion, said connecting rod including a return-bent end integral with the shank and closed by said first spoon portion, a fishhook having an eye portion, a leader line having an eye portion, said eye portion of the fishhook and said eye portion of the leader line being selectively interchangeably connected respectively to the straight shank of the second spoon portion of the body and to said return-bent end of the connector rod so that the fish lure is operable in either longitudinal direction.

6. A multi-form fish lure comprising an elongated body having first and second concavo-convex spoon portions assembled in overlapping longitudinally staggered relation, each spoon portion providing a centrally disposed aperture therethrough, said first spoon portion having an elongated substantially straight shank extended through the aperture of the second spoon portion and including an elongated slot therethrough in spaced relation to said centrally disposed aperture, the second spoon portion having an angularly bent shank extended through the centrally disposed aperture of the first spoon portion, locking means connected to said straight shank for holding the spoon portions in such assembly, a fishhook having an eye portion, a shank portion and a return-bent barbed end with said eye portion being registered with said centrally disposed aperture in the first spoon portion of the body receiving said angularly bent shank of the second spoon portion therethrough with the shank portion of the fishhook extended through said elongated slot in the second portion to support the fishhook in substantially rigid trailing relation to the body of the fish lure, a leader line including an eye portion, a swivel connector mounted on said eye portion of the leader line to minimize twisting of the line and having an eye portion receiving said straight shank of the first spoon portion of the body and positioning said swivel connector in contiguous relation with said second spoon portion of the body, said swivel connector being operable as a clapper during engagement of the swivel connector against the second spoon portion.

7. A fish lure comprising a first spoon having concave and convex sides, a second spoon having concave and convex sides, the concave sides of the spoons being in facing engagement in partially overlapping relation, the second spoon having a shank integral therewith extended releasably through a central portion of the first spoon and engaging the convex side thereof, the first spoon having a shank extended releasably through the second spoon, said shanks being disposed on a line longitudinally of the spoons and about which the spoons are symmetrical, means releasably connected to the shank of the first spoon on the convex side of the second spoon to preclude inadvertent disengagement of the shank of the first spoon therefrom, the first spoon having an opening substantially aligned with the shanks, a connecting rod, a fishhook, and line connector, the fishhook and the connecting rod being alternately connected to the shank of the second spoon in endward extension through the opening of the first spoon, the connector and the fishhook being alternately connected to the shank of the first spoon, and the connector and the fishhook being alternately connected to the connecting rod when it is connected to the shank of the second spoon.

References Cited in the file of this patent
UNITED STATES PATENTS
2,588,300    Smith _____ Mar. 4, 1952